(12) United States Patent
Mizrahi

(10) Patent No.: US 10,545,390 B2
(45) Date of Patent: Jan. 28, 2020

(54) CALIBRATION FOR AN OPTICAL DEVICE

(71) Applicant: Lumentum Operations LLC, Milpitas, CA (US)

(72) Inventor: Amit Mizrahi, San Jose, CA (US)

(73) Assignee: Lumentum Operations LLC, Milpitas, CA (US)

( * ) Notice: Subject to any disclaimer, the term of this patent is extended or adjusted under 35 U.S.C. 154(b) by 0 days.

(21) Appl. No.: 16/058,755

(22) Filed: Aug. 8, 2018

(65) Prior Publication Data
US 2019/0146301 A1 May 16, 2019

Related U.S. Application Data

(60) Provisional application No. 62/584,485, filed on Nov. 10, 2017.

(51) Int. Cl.
*G02F 1/225* (2006.01)
*G02F 1/21* (2006.01)
*H04B 10/516* (2013.01)

(52) U.S. Cl.
CPC ........ *G02F 1/225* (2013.01); *G02F 2001/212* (2013.01); *G02F 2203/69* (2013.01); *H04B 10/516* (2013.01)

(58) Field of Classification Search
CPC .............. G02F 1/225; G02F 2203/69; G02F 2001/212; H04B 10/516
See application file for complete search history.

(56) References Cited

U.S. PATENT DOCUMENTS

| 8,050,351 B2* | 11/2011 | Cho | G02F 1/225 332/103 |
| 8,705,900 B2* | 4/2014 | Goh | G02F 1/0121 385/2 |
| 2016/0282638 A1* | 9/2016 | Bhandare | G01J 4/00 |

OTHER PUBLICATIONS

S. Shimotsu et al., "Single Side-Band Modulation Performance of a LiNbO3 Integrated Modulator Consisting of Four-Phase Modulator Waveguides", Apr. 2001, 4 pages.
Tetsuya Kawanishi et al. "High-Speed Control of Lightwave Amplitude, Phase, and Frequency by Use of Electrooptic Effect", Jan. 2007, 13 pages.
J. Svarny, "Bias driver of the Mach-Zehnder intensity electro-optic modulator, based on harmonic analysis", Jul. 2014, 6 pages.

* cited by examiner

*Primary Examiner* — Ryan A Lepisto
(74) *Attorney, Agent, or Firm* — Harrity & Harrity, LLP

(57) ABSTRACT

A device may include a plurality of interferometers. The plurality of interferometers may include a parent interferometer, a first child interferometer coupled to a first branch of the parent interferometer, and a second child interferometer coupled to a second branch of the parent interferometer. At least one of the plurality of interferometers may be calibrated by maintaining collinearity of an output of the first branch and the second branch and using perturbation signals.

20 Claims, 10 Drawing Sheets

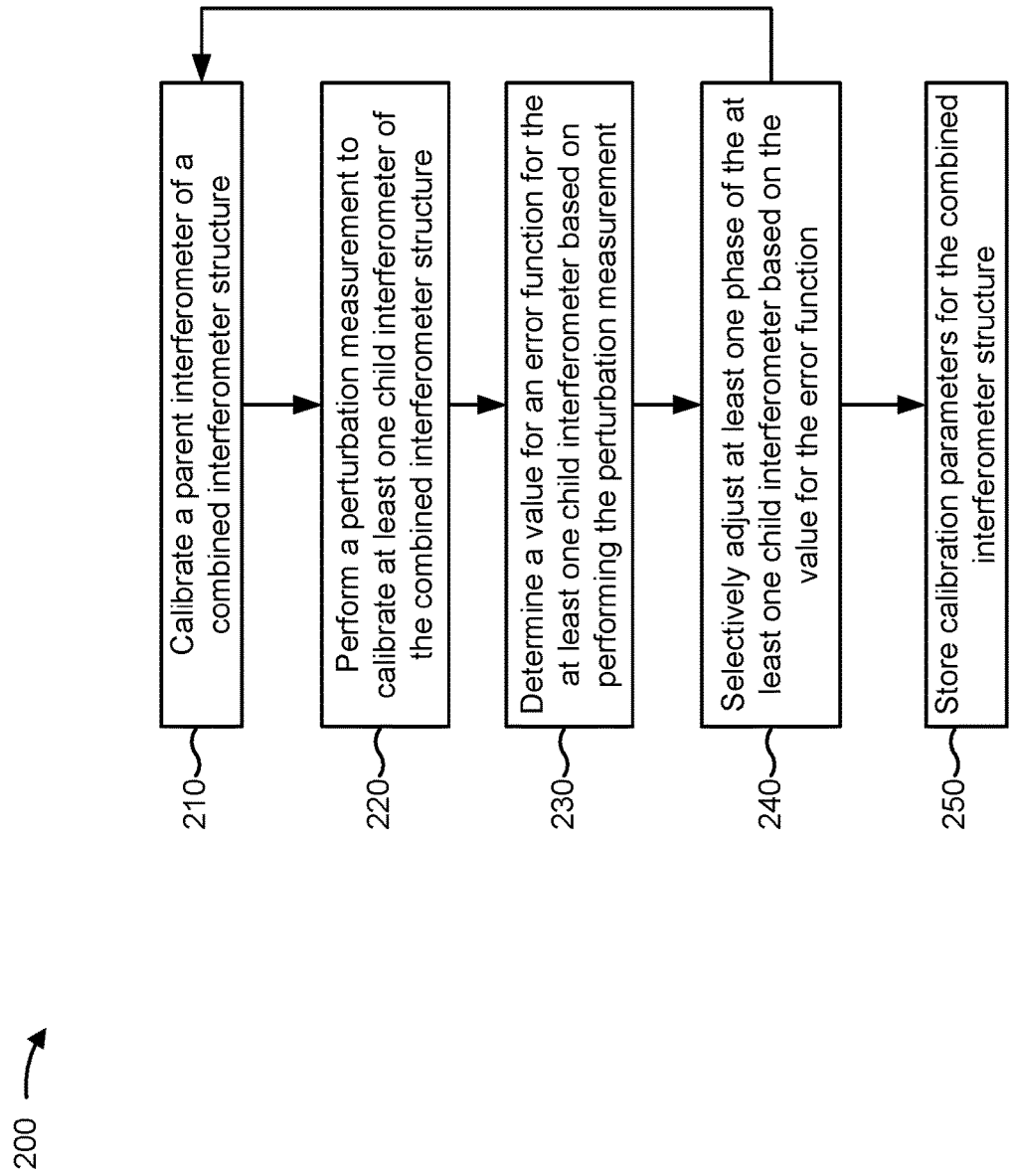

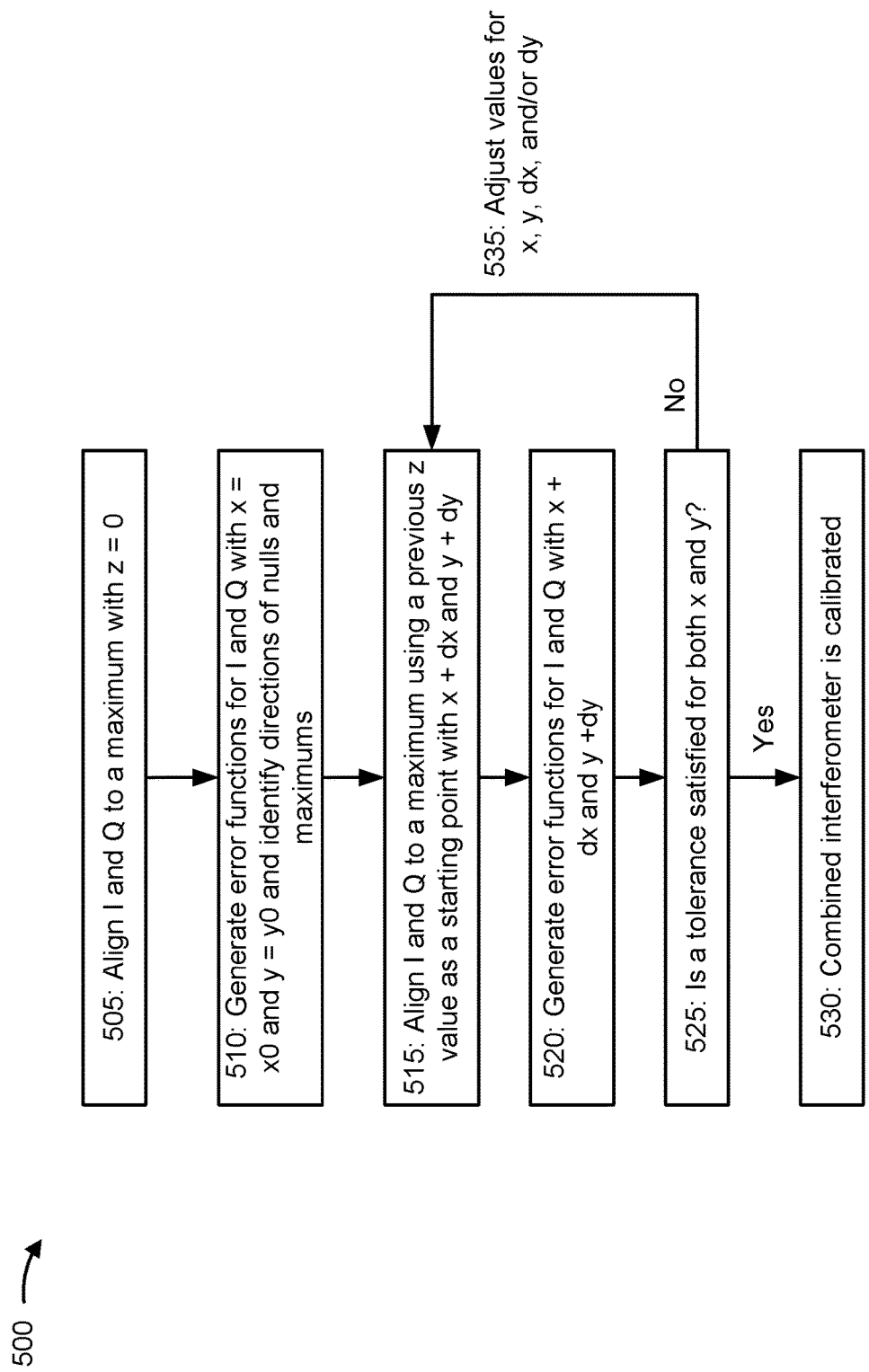

CALIBRATION FOR AN OPTICAL DEVICE

RELATED APPLICATION(S)

This application claims priority under 35 U.S.C. § 119 to U.S. Provisional Patent Application No. 62/584,485, filed on Nov. 10, 2017, the content of which is incorporated by reference herein in its entirety.

TECHNICAL FIELD

The present disclosure relates to optical devices. More particularly, some aspects of the present disclosure relate to a control technique for calibrating an optical device, such as a combined interferometer that includes a parent interferometer, a first child interferometer associated with a first branch of the combined interferometer, and a second child interferometer associated with a second branch of the combined interferometer.

BACKGROUND

An electro-optic device, such as an electro-optic IQ phase modulator, may be used to encode data, represented by a set of electrical signals, into the phase and/or amplitude of light as the light passes through the IQ phase modulator. In some IQ phase modulators (e.g., a Mach-Zehnder (MZ) modulator), light (e.g., generated by a light source, such as a laser) is split between an I branch and a Q branch of the modulator, where each branch comprises a series of optical waveguides with a set of electrodes placed along (e.g., on, over, adjacent to, and/or the like) the series of waveguides. In order to enable IQ modulation, the portion of the light in the Q branch is put at 90 degrees (°) out of phase (i.e., at quadrature) from the portion of the light passing through the I branch. For example, respective parent direct current (DC) biases may be applied to electrodes arranged on the I branch and/or the Q branch in order to introduce phase shifts that put the portion of the light in the Q branch at quadrature with the portion of the light in the I branch. Other types of branches may be possible that are different from an I branch and a Q branch for a combined interferometer structure, such as for a modulator.

In the IQ modulator, the portions of the light are further split between arms of each branch (e.g., left and right arms of the I branch, and left and right arms of the Q branch). Although arms may be referred to in terms of left and right, other orientations may be possible. In order to encode data in each portion of the light while passing through the IQ phase modulator, a first electrical signal (e.g., a radio frequency (RF) signal) is differentially applied to electrodes on the left and right I arms (herein referred to as an I signal), while a second electrical signal is differentially applied to electrodes on the left and right Q arms (herein referred to as a Q signal). The I signal and the Q signal represent the data to be encoded in the phase and/or the amplitude of the light. Applying the I signal and the Q signal to the respective arms provides amplitude modulation and/or phase modulation of the light passing through the I and Q branches, respectively (e.g., for QPSK phase modulation may be performed, for QAM amplitude modulation and phase modulation may be performed, etc.). The modulated portions of the light are then recombined in the modulator to form modulated output light. Here, the amplitude and/or the phase of modulated output light are a result of the application of the I signal and the Q signal and, thus, the modulated output light carries the data.

SUMMARY

According to some possible implementations, A device may include a plurality of interferometers. The plurality of interferometers may include a parent interferometer, a first child interferometer coupled to a first branch of the parent interferometer, and a second child interferometer coupled to a second branch of the parent interferometer. At least one of the plurality of interferometers may be calibrated by maintaining collinearity of an output of the first branch and the second branch and using perturbation signals.

According to some possible implementations, a combined interferometer may include a parent interferometer, a first child interferometer, and a second child interferometer forming a combined interferometer structure and one or more components. The one or more components may be configured to apply, concurrently, a first perturbation signal to the first child interferometer and a second perturbation signal to the second child interferometer while maintaining collinearity of a first output of the first child interferometer and a second of the second child interferometer. The first perturbation signal may be orthogonal to the second perturbation signal. The one or more components may be configured to determine values for an error function based on a third output of the combined interferometer structure based on applying the first perturbation signal and the second perturbation signal. The one or more components may be configured to selectively adjust a phase of the combined interferometer based on the values for the error function to calibrate the combined interferometer.

According to some possible implementations, a method may include applying, by a device, a first perturbation signal to a first child interferometer and a second perturbation signal to a second child interferometer while maintaining collinearity of an output of the first child interferometer and an output of the second child interferometer. The first child interferometer may form a first branch of a parent interferometer and the second child interferometer may form a second branch of the parent interferometer. The first perturbation signal may be orthogonal to the second perturbation signal. The method may include determining, by the device, values for an error function based on an output of the parent interferometer and based on applying the first perturbation signal and the second perturbation signal. The method may include selectively adjusting, by the device, a characteristic relating to at least one perturbation signal of the first perturbation signal, the second perturbation signal, or a third perturbation signal for the parent interferometer based on the values for the error function to calibrate the first child interferometer and the second child interferometer.

BRIEF DESCRIPTION OF THE DRAWINGS

FIG. 2 is a flow chart of an example process for configuring example implementations described herein.

FIGS. 5A-5E are diagrams of example implementations relating to the example process shown in FIG. 2.

DETAILED DESCRIPTION

Figure 1:
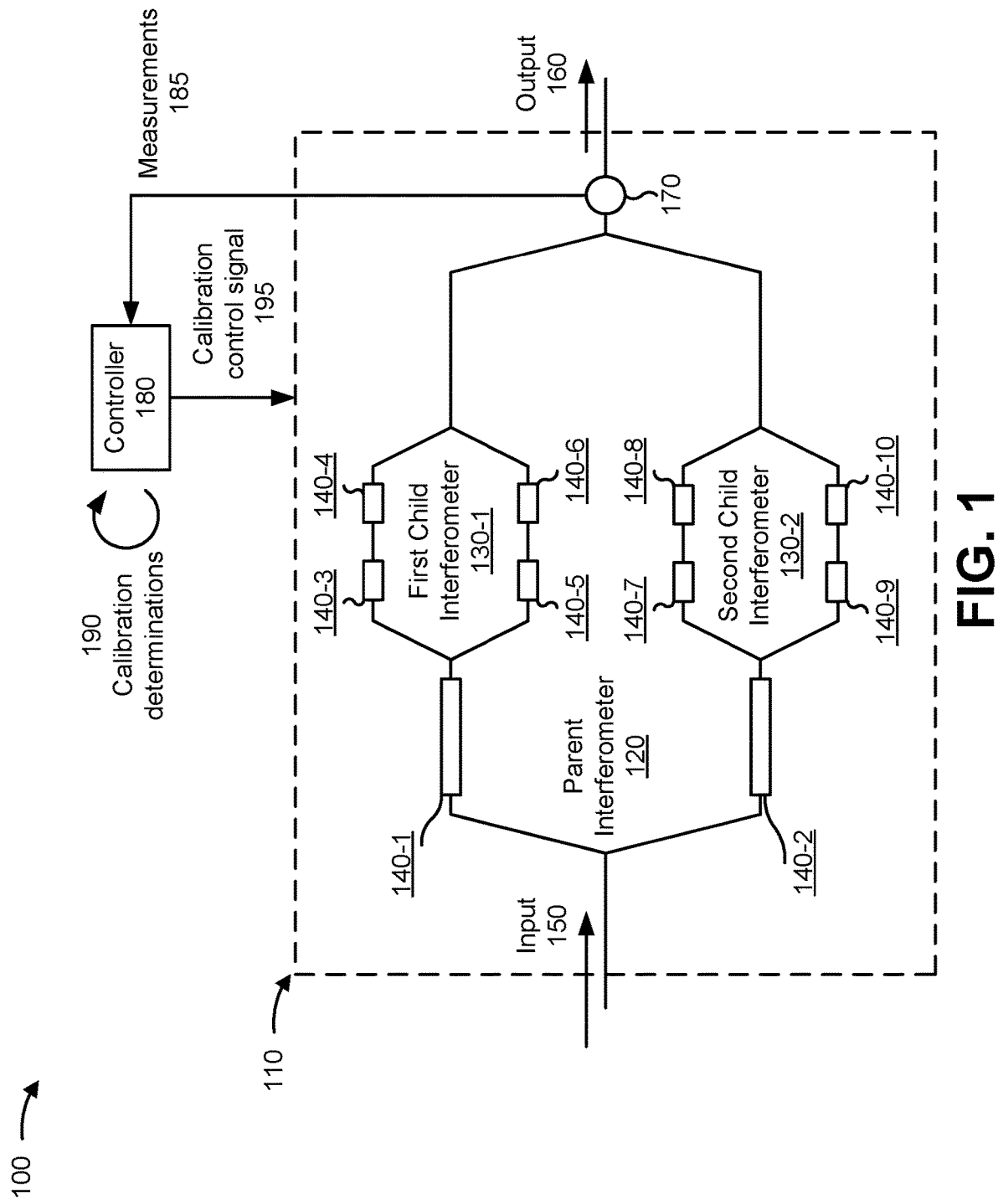
FIG. 1 is a diagram of an overview of an example implementation described herein.

The following detailed description of example implementations refers to the accompanying drawings. The same reference numbers in different drawings may identify the same or similar elements.

As described above, an electro-optic IQ phase modulator may be used to encode data into a phase and/or an amplitude of light that passes through the IQ phase modulator. In order to operate a device, such as the IQ phase modulator or another type of modulator, interferometer, and/or the like for a given encoding scheme (e.g., quadrature phase shift keying (QPSK), quadrature amplitude modulation (QAM), 16 QAM, 64 QAM, and/or the like), and/or the like, the device may be calibrated. For example, for an IQ phase modulator, calibration may be performed by blocking a first branch of the IQ phase modulator using a threshold bias and calibrating a second branch of the IQ phase modulator. In this case, after completion of calibration of the second branch, calibration may be performed by blocking the second branch with the threshold bias and calibrating the first branch. However, blocking waveguides of a device using a threshold bias for relatively high powers (e.g., powers greater than, for example, 1 milliWatt (mW), 3 mW, 5 mW, and/or the like) may result in damage to the device. Moreover, blocking a first branch to calibrate a second branch may result in excessive time to calibrate a multi-branch device, such as a modulator, an interferometer, and/or the like. Furthermore, in another technique, with taps for each branch to monitor each branch using photo-detectors may result in excessive complexity, excessive cost, insufficient accuracy (e.g., as a result of stray light), and/or the like.

Some implementations described herein provide an interferometer that is configured to be calibrated without blocking branches of the interferometer. For example, a combined interferometer structure may be calibrated based on maintaining collinearity of an optical field vector in complex (e.g., phasor) space, applying dithering signals to the interferometer, performing measurements of the dithering signals at an output of the combined interferometer structure, and selectively adjusting a phase of the combined interferometer structure. In this way, an interferometer may be calibrated for relatively high optical powers without damaging the interferometer. Moreover, based on using orthogonal dithering signals for a combined interferometer structure with a parent interferometer, a first child interferometer, and a second child interferometer, some implementations, described herein, may enable concurrent calibration of multiple interferometers of the combined interferometer structure. In this way, a calibration time for the combined interferometer structure may be reduced relative to sequential calibration of branches of the combined interferometer structure.

Although some implementations, described herein, are described in terms of interferometers, such as Mach-Zehnder interferometers (MZIs), implementations described herein may be used for other types of devices, such as modulators (e.g., Mach-Zehnder modulators (MZMs)) and/or the like. Moreover, some implementations, described herein, may be used for waveguide optics, free-space optics, and/or the like, and for communications systems, for modulation, for measurement, and/or the like.

FIG. 1 is a diagram of an overview of an example implementation 100 described herein. FIG. 1 shows an example implementation 100 of an optical device 110.

As shown in FIG. 1, optical device 110 may be a combined interferometer that includes a parent interferometer 120 coupled to a first child interferometer 130-1 and a second child interferometer 130-2. First child interferometer 130-1 may form a first branch of the combined interferometer and second child interferometer 130-2 may form a second branch of the combined interferometer. Optical device 110 may include a set of electrodes 140-1 through 140-10. For example, parent interferometer 120 may include electrodes 140-1 and 140-2 that create a phase delay between the first branch and the second branch.

As further shown in FIG. 1, first child interferometer 130-1 may include electrodes 140-3, 140-4, 140-5, and 140-6. In this case, electrodes 140-3 and 140-5 may create a phase delay between arms of the first branch. For example, in a combined MZI, the first branch may be an I branch, which includes a first, right I arm and a second, left I arm, and the second branch may be a $Q$ branch, which includes a first, right $Q$ arm and a second, left $Q$ arm. Further to the example, electrodes 140-4 and 140-6 may be used to modulate a signal of the first I arm and the second I arm, respectively. Additionally, or alternatively, second child interferometer 130-2 may include electrodes 140-7 and 140-8 to control a phase delay and a signal modulation, respectively, on the first $Q$ arm and electrodes 140-9 and 140-10 to control a phase delay and a signal modulation, respectively, on the second $Q$ arm. In another example, second child interferometer 130-2 (and/or another interferometer) may include electrodes 140-7 and 140-8 to control the signal modulation and the phase delay, respectively. In another example, the order of the phase delay and modulation electrodes may be reversed, e.g. 140-3 may be used for modulation and 140-4 may be used for phase delay.

As further shown in FIG. 1, an input 150 may be received at parent interferometer 120. For example, light with a particular wavelength may be provided to parent interferometer 120, such as from a laser diode. In this case, the input 150 may be divided into the first branch and the second branch and may experience a phase delay from electrodes 140-1 and 140-2. In the first branch, input 150 may be divided into the first I arm and the second I arm, may experience a phase delay from electrodes 140-3 and 140-5, and may be modulated with data by electrodes 140-4 and 140-6. Similarly, in the second branch, input 150 may be divided into the first Q arm and the second Q arm, may experience a phase delay from electrodes 140-7 and 140-9, and may be modulated with data by electrodes 140-8 and 140-10. Based on being phase delayed and modulated with data, portions of input 150 may be recombined and provided as output 160. Although arms, such as I arms or Q arms, may be described herein in terms of first and second, other terminologies may be possible, such as left and right, top and bottom, and/or the like irrespective of implementation geometry.

In some implementations, one or more other components may be included in optical device 110 and/or connected thereto. For example, a measurement component 170 may be connected to an output of the combined interferometer. Measurement component 170 may include a power monitor, a photodiode, and/or the like to measure an optical power of output 160. For example, measurement component 170 may be a photodiode connected to monitor output 160, and to perform measurements of an optical power of output 160. In some implementations, measurement component 170 may be included in optical device 110. Additionally, or alternatively, measurement component 170 may be separate from optical device 110, and may be connected to optical device 110 to calibrate optical device 110. In some implementations, a controller 180 may be connected to measurement component 170 and optical device 110. For example, controller 180 may be connected to receive information regarding measurements of output 160 and to control electrodes 140 (e.g., electrodes 140-1, 140-2, 140-3, 140-5, 140-7, and 140-9 for calibration of phase delays).

In some implementations, controller 180 may be a processor executing software instructions stored by a non-transitory computer-readable medium, such as a memory and/or a storage component. Controller 180 is implemented in hardware, firmware, or a combination of hardware and software. Controller 180 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. A computer-readable medium is defined herein as a non-transitory memory device. A memory device includes memory space within a single physical storage device or memory space spread across multiple physical storage devices. Additionally, or alternatively, hardwired circuitry may be used in place of or in combination with software instructions to perform one or more processes described herein. Thus, implementations described herein are not limited to any specific combination of hardware circuitry and software.

In some implementations, controller 180 may cause dithering signals to be applied to, for example, parent interferometer 120, first child interferometer 130-1, and second child interferometer 130-2, which may result in output 160 being generated based on input 150. As shown by reference number 185, during calibration, measurement component 170 may perform measurements of output 160, and may provide information identifying the measurements to controller 180 for processing. As shown by reference number 190, controller 180 may perform calibration processing. For example, using the measurements and information identifying the dithering signals, controller 180 may determine values for an error function, as described herein. Based on the values for the error function, controller 180 may selectively determine an adjustment to a characteristic relating to a dithering signal to calibrate optical device 110. For example, controller 180 may determine an adjustment to a phase of optical device 110, a phase of an interferometer of optical device 110 (e.g., parent interferometer 120, first child interferometer 130-1, second child interferometer 130-2, and/or the like), and/or the like). As shown by reference number 195, controller 180 may provide a calibration control signal to calibrate electrodes 140. For example, controller 180 may determine a null point, a maximum point, a quadrature point, and/or the like, as described herein, which may enable use of optical device 110 for modulation schemes, such as QPSK and/or the like. In some implementations, a calibration signal directed to electrodes 140-4, 140-6, and/or the like may be disabled during at least a portion of calibration to perform calibration.

Although some implementations, described herein, are described in terms of a combined interferometer with a parent interferometer and a set of two child interferometers, other combined interferometer structures are possible, such as combined interferometers with additional sets of child interferometers (e.g., a child interferometer may be a parent interferometer of another set of child interferometers) and/or the like.

As indicated above, FIG. 1 is provided merely as an example. Other examples are possible and may differ from what was described with regard to FIG. 1.

FIG. 2 is a flow chart of an example process 200 for calibrating a combined interferometer structure. In some implementations, example process 200 may be performed by a controller, such as controller 180 shown in FIG. 1. Additionally, or alternatively, example process 200 may be performed by another component, such as a component of a device that includes the combined interferometer structure, a component of a calibration device separate from the combined interferometer structure, and/or the like.

As shown in FIG. 2, process 200 may include calibrating a parent interferometer of a combined interferometer structure (block 210). For example, a controller may calibrate the parent interferometer of the combined interferometer structure. In some implementations, the combined interferometer structure may be a Mach-Zehnder interferometer (MZI), a Mach-Zehnder modulator (MZM), and/or the like. In some implementations, the combined interferometer structure may be associated with a threshold optical power, such as an optical power greater than 1 mW, greater than 3 mW, greater than 5 mW, greater than 10 mW, and/or the like. In some implementations, the combined interferometer structure may be a waveguide optics based interferometer structure. For example, the parent interferometer may couple to child interferometers via a set of waveguides. Additionally, or alternatively, the parent interferometer may couple to the child interferometers via free space.

In some implementations, the controller may control one or more electrodes of the combined interferometer structure to calibrate the parent interferometer. For example, the controller may align an I branch of the combined interferometer (e.g., a first branch that includes a first child interferometer) and a Q branch of the combined interferometer (e.g., a second branch of the combined interferometer) to a maximum value. In this case, the controller may control a voltage differential of electrodes corresponding to branches of the parent interferometer from an initial voltage differential (e.g., a zero voltage differential) to a target voltage differential (e.g., a voltage differential with both the I branch and the Q branch maximized). In some implementations, the combined interferometer structure may include additional branches, such as 3 branches, 4 branches, 5 branches, and/or the like.

In some implementations, the controller may maintain the child interferometers at a static state (e.g., an initial state) while calibrating the parent interferometer. In some implementations, the controller may receive information identifying a measurement of an output of the combined interferometer structure to determine whether the I branch and the Q branch are aligned to the maximum value. For example, the controller may receive measurement information from a measurement component positioned at an output of the combined interferometer structure, and may adjust the voltage differential, such as using a crawling procedure, a secant procedure, and/or the like to determine a zero value for an error function. In this way, the controller may calibrate the parent interferometer using measurements performed at the output of the combined interferometer structure, thereby reducing a calibration difficult relative to using measurements obtained from multiple portions of the combined interferometer structure.

As further shown in FIG. 2, process 200 may include perform a perturbation measurement to calibrate at least one child interferometer of the combined interferometer structure (block 220). For example, the controller may perform the perturbation measurement of a perturbation signal to calibrate the at least one child interferometer of the combined interferometer structure. In some implementations, the controller may measure a result of applying a dithering signal to perform the perturbation measurement. For example, the controller may apply the dithering signal to perturb the at least one child interferometer, and may measure a result of applying the dithering signal to calibrate the at least one child interferometer. In some implementations, the controller may provide a control signal to cause the dithering signal to be applied. In some implementations, the controller may apply the dithering signal to calibrate multiple child interferometers. For example, the controller may apply orthogonal dithering signals to calibrate the first child interferometer and the second child interferometer concurrently. In this case, the orthogonal dithering signals may be a sine dithering signal and a cosine dithering signal or another type of set of orthogonal dithering signals.

In some implementations, the dithering signals may be offline digital dither tones. For example, a dithering voltage in the time-domain may be determined as:

$$V = V_0 + V_1 \sin(\omega t) \quad (1)$$

where V represents the dithering voltage function, $V_0$ represents a center voltage around which the dither perturbation is performed, $V_1$ a voltage amplitude of the dither, $\omega$ represents a temporal angular frequency, and t represents a time value. Based on performing time-dependent sampling, a discrete series is determined as:

$$\omega t = \Omega_m = 2\frac{\pi m}{N} \mid m = 0, 1, \ldots, N-1 \quad (2)$$

$$V_m = V_0 + V_1 \sin(2\pi m/N) \quad (3)$$

where $\Omega_m$ represents a phase, m represents a sample iteration, N represents a quantity of samples per period, and $V_m$ represents an offline voltage domain series where offline measurements may be taken, such that the time domain spacing has been converted to offline digital voltage domain spacing. In this case, the offline voltage domain series may be associated with a discrete-space orthogonality relation, thereby allowing for determination of the error function. A discrete series, $Uk = \sin(2\pi km/N)$ and $Wk = \cos(2\pi km/N)$, for a set of orthogonal functions are defined as:

$$\langle U_k, U_{k'} \rangle = \sum_{m=0}^{N-1} \sin(2\pi km/N)\sin(2\pi k'm/N) = \frac{N}{2}\delta_{kk'} \quad (4)$$

$$\langle U_k, W_{k'} \rangle = \sum_{m=0}^{N-1} \sin(2\pi km/N)\cos(2\pi k'm/N) = 0 \quad (5)$$

where k corresponds to the frequency in voltage space, m corresponds to the sample in voltage space, and the $\langle,\rangle$ operator indicates a discrete-space inner-product.

Further to the example, the single Mach-Zehnder interferometer transfer function may be represented as:

$$T = |a + be^{-j\Delta\phi}|^2 = a^2 + b^2 + 2ab\cos(\Delta\phi) \quad (6)$$

where a represents to an amplitude of light resulting from an arm of the single Mach-Zehnder interferometer after an output combiner, b represents to an amplitude resulting from another other arm after the output combiner, $\Delta\phi$ represents a phase difference between the two arms, and T represents the optical power transfer function. For a voltage within perturbation range $V_1$, (3) may be represented as:

$$\Delta\phi_m = \phi_0 + \phi_1 \sin(2\pi m/N) \quad (7)$$

which may result in (6) being expanded to:

$$\cos(\Delta\phi_m) = \quad (8)$$

$$\cos(\phi_0)\cos[\phi_1\sin(2\pi m/N)] - \sin(\phi_0)\sin[\phi_1\sin(2\pi m/N)] = \ldots$$

$$\ldots = \cos(\phi_0)[J_0(\phi_1) + 2J_2(\phi_1)\cos(2\cdot 2\pi m/N) + \ldots] -$$

$$\sin(\phi_0)[2J_1(\phi_1)\sin(2\pi m/N) + 2J_3(\phi_1)\sin(3\cdot 2\pi m/N) + \ldots]$$

where higher order terms are omitted and represented by . . ., and $J_p(\bullet)$ is a Bessel function of the first kind of order p. Based on a series of measurement values at the discrete voltages, as represented by (8) substituted into (6), an error function may then be obtained by performing the inner product of (6) with $\sin(2\pi mn/N)$ according to (4). The error function may be determined as, for example:

$$f = -2abNJ_1(\phi_1)\sin(\phi_0) \quad (9)$$

In this case, the error function crosses zero for nulls of the transfer function (e.g., $\phi_0 = \pi$), as well as for maxima (e.g., $\phi_0 = 0$). The sign of the slope in the zero crossing of the error function may be positive for null points and negative for maxima points.

Similarly, a quadrature point may be determined based on for the term corresponding to $J_0$ in (8) and/or a second harmonic value of the $J_2(\phi_1)\cos(2\cdot 2\pi m/N)$ term. In some implementations, a single period of sampling (N) may be used to determine the maximum, the null, the quadrature point, and/or the like, thereby improving performance relative to another technique that requires multiple sampling periods.

In some implementations, the controller may maintain collinearity when dithering the combined interferometer structure. For example, the controller may maintain collinearity of an optical field vector in complex space (e.g., phasor space). In this case, the controller may adjust a parent interferometer voltage differential, a first child interferometer voltage differential, and/or a second child interferometer voltage differential (e.g., concurrently) to maintain collinearity between the two child interferometers. Additionally, or alternatively, the controller may adjust a relative phase to maintain collinearity and calibrate the combined interferometer structure. In some implementations, the controller may apply a particular type of dithering signal. For example, the controller may apply an analog dithering signal. Additionally, or alternatively, the controller may apply a digital dithering signal. In some implementations, the controller may dither the combined interferometer structure in a particular domain. For example, the controller may dither the combined interferometer in a time-domain (e.g., using a time-varying signal). Additionally, or alternatively, the controller may dither the combined interferometer structure in a phase-domain, a voltage-domain, and/or the like.

As further shown in FIG. 2, process 200 may include determining a value for an error function for the at least one child interferometer based on performing the perturbation measurement (block 230). For example, the controller may determine the value for the error function based on performing the perturbation measurement. In some implementations, the controller may generate the error function to determine the value for the error function. For example, the controller may generate, based on a single output of the combined interferometer structure, error functions for the I branch and the Q branch at voltage differentials for the I branch and the Q branch based on the dithering signal. In this way, the controller reduces a difficulty in calibrating the combined interferometer structure relative to obtaining measurements of the combined interferometer structure from multiple portions of the combined interferometer structure.

In some implementations, the controller may identify, based on the error functions, directions for a null value, a maximum value, and/or the like, as described herein. For example, the controller may determine whether a rate of change of the error function and/or a sign of the error function is negative, positive, and/or the like to determine directions for the null value, the maximum value, and/or the like. In some implementations, the controller may determine the value for the error function based on multiple measurements of the single output of the combined interferometer structure. For example, the controller may receive periodic measurements of the output of the combined interferometer structure based on applying the dithering signals. In this case, the controller may perform the multiple measurements with a configured voltage spacing, a configured time spacing, and/or the like. In some implementations, the controller may perform a particular quantity of measurements to calibrate the combined interferometer structure, such as 2 measurements, 3 measurements, 4 measurements, 5 measurements, 6 measurements, and/or a greater quantity of measurements. In this way, by using collinearity of the optical field vector, the controller may calibrate at least one child interferometer based on an output from the combined interferometer structure.

As further shown in FIG. 2, process 200 may include selectively adjusting at least one phase of the at least one child interferometer based on the value for the error function (block 240). For example, the controller may selectively adjust the phase of the combined interferometer structure (e.g., of the at least one child interferometer) based on the value of the error function. In some implementations, the controller may selectively adjust the phase of a particular interferometer of the combined interferometer structure. For example, the controller may adjust the phase of the parent interferometer, the first child interferometer, the second child interferometer, and/or the like. In some implementations, the controller may adjust a component of the combined interferometer structure to adjust the phase of the combined interferometer. For example, the controller may adjust a voltage of an electrode (e.g., of a child interferometer), a voltage differential of electrodes (e.g., a relative voltage of electrodes on different arms of a child interferometer), and/or the like. In some implementations, the controller may adjust a center of a dither when adjusting the phase of the combined interferometer.

In some implementations, the controller may continue to apply the dithering signal and perform subsequent measurements. For example, based on the value for the error function or based on the phase or voltage convergence, the controller may determine whether one or more threshold criteria are satisfied. In this case, based on the one or more threshold criteria not being satisfied, the controller may adjust the phase of the combined interferometer structure, continue to apply dithering signals, perform measurements, determine values for the error function, and adjust the phase of the combined interferometer. For example, voltage tolerance may be determined by two voltages that show opposite signs of the error function and/or the like. Additionally, or alternatively, based on determining that the one or more threshold criteria are satisfied (e.g., when a voltage tolerance for calibrating the first child interferometer and/or the second child interferometer is satisfied), the controller may determine not to adjust the phase of the combined interferometer structure, and may store calibration parameters for the combined interferometer.

As further shown in FIG. 2, process 200 may include storing calibration parameters for the combined interferometer structure (block 250). For example, the controller may store the calibration parameters for the combined interferometer structure. In some implementations, the controller may set the calibration parameters for the combined interferometer to store the calibration parameters. For example, the controller may fix a voltage of an electrode at a static voltage value based on determining that one or more threshold criteria associated with calibrating the combined interferometer are satisfied. Additionally, or alternatively, the controller may provide information identifying the voltage of the electrode to a bias source of the combined interferometer to cause the combined interferometer to use the voltage for the electrode during subsequent operation.

Although FIG. 2 shows example blocks of process 200, in some implementations, process 200 may include additional blocks, fewer blocks, different blocks, or differently arranged blocks than those depicted in FIG. 2. Additionally, or alternatively, two or more of the blocks of process 200 may be performed in parallel.

Figure 3A:
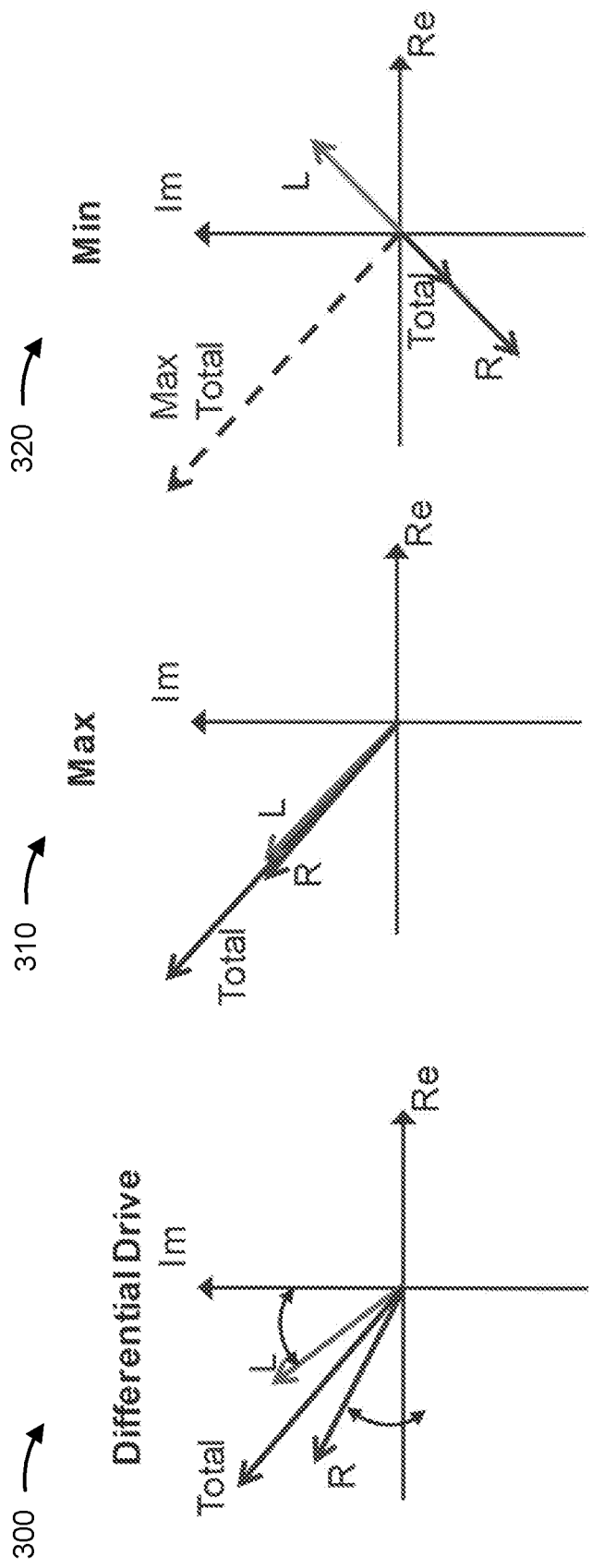
FIGS. 3A and 3B are diagrams of example implementations relating to the example process shown in FIG. 2.
Figure 3B:
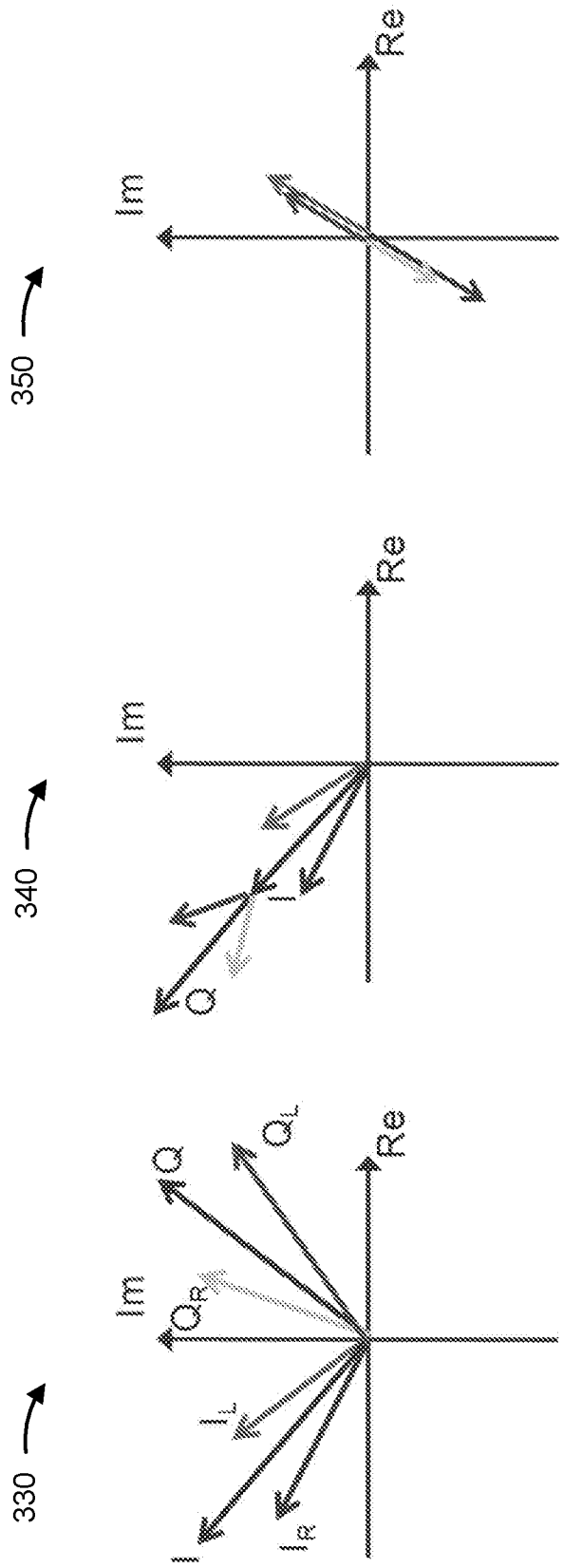

FIGS. 3A and 3B are diagrams of an example implementation relating to example process 200 shown in FIG. 2.

As shown in FIG. 3A, and by diagram 300, calibration control of a phase of a single Mach-Zehnder interferometer may be determined based on a vector representation of an electric field of branches of the single Mach-Zehnder interferometer in complex phasor space. A voltage differential may be calculated as a difference between a first branch voltage $V_L$ and a second branch voltage $V_R$. Similarly, a total voltage may be a resultant of the first branch and the second branch. As shown in diagram 310, a maximum voltage occurs when the first branch L and the second branch R are aligned. In contrast, as shown in diagram 320, a minimum voltage occurs when the first branch and the second branch are collinear and opposite. In this case, based on identifying the maximum voltage and the minimum voltage while maintaining arms of child interferometers, which form branches of a combined interferometer structure, at an initial state, a controller may determine branch alignment and a quadrature point for a parent interferometer of the combined interferometer structure.

As shown with regard to FIG. 3B, calibration control may be performed for two combined interferometers. As shown by diagram 330, two vectors I and Q may each include a left arm and right arm $I_L$ and $I_R$, respectively, for I, and $Q_L$ and $Q_R$ for Q. As shown by diagram 340, I and Q may each be collinear may not be at a null or a maximum. As shown in diagram 350, I and Q may be at respective null points and may be collinear. In the case where null optimization is performed on both I and Q simultaneously, the end result may look like Diagram 350.

As indicated above, FIGS. 3A and 3B are provided merely as an example. Other examples are possible and may differ from what was described with regard to FIGS. 3A and 3B.

Figure 4:
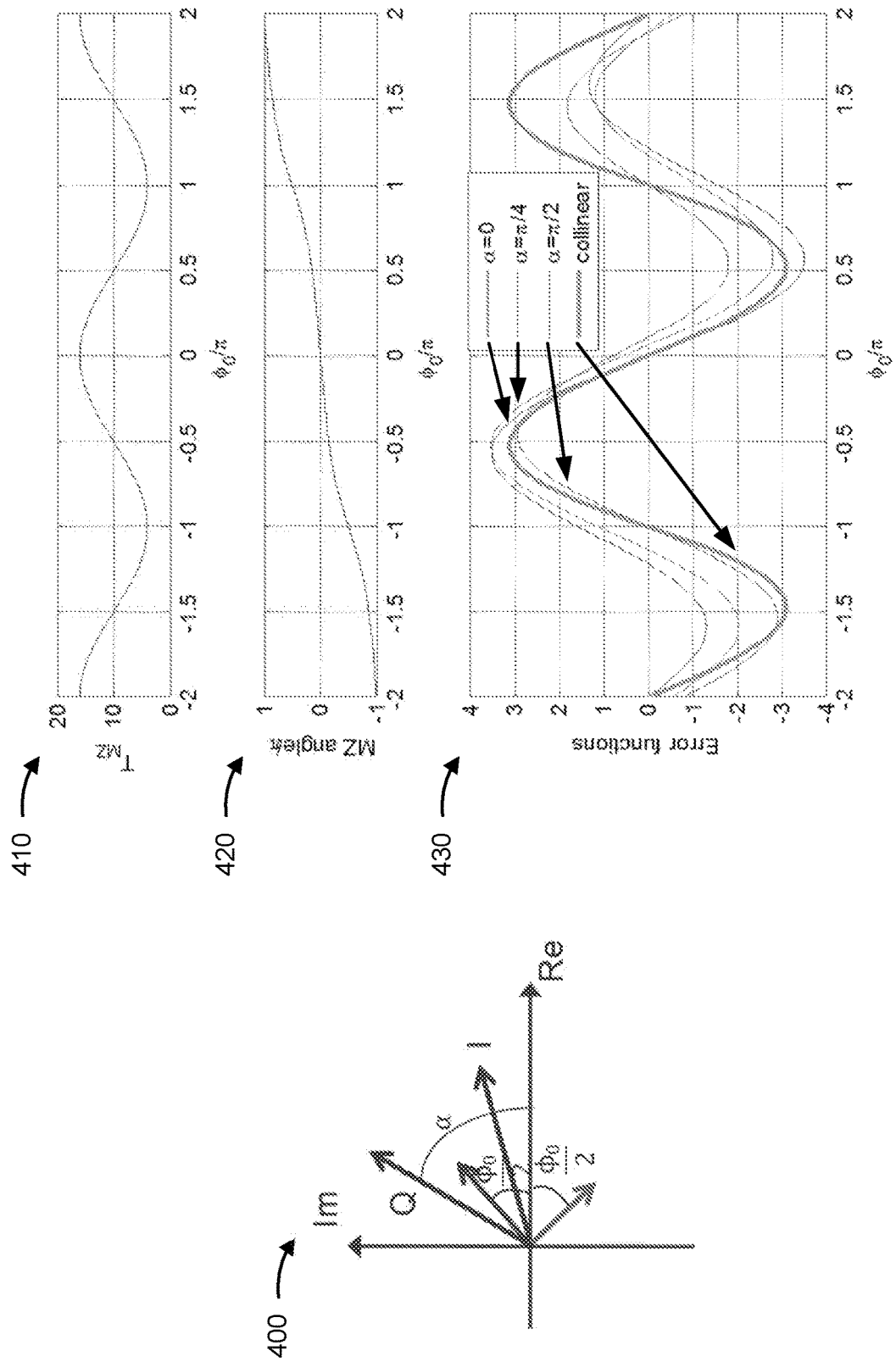
FIG. 4 is a diagram of an example implementation relating to the example process shown in FIG. 2.

FIG. 4 is a set of diagrams 410, 420, and 430 of an example implementation relating to example process 200 shown in FIG. 2.

With regard to FIG. 4, a transfer function of a combined interferometer may take the form:

$$T_{MZ} = \left| ae^{-j\frac{\Delta\phi}{2}} + be^{+j\frac{\Delta\phi}{2}} + re^{+j\alpha} \right|^2 \quad (10)$$

where a represents an amplitude of the light resulting from an arm of an I branch of the combined interferometer after an output combiner of a parent (e.g. $I_L$); b represents an amplitude resulting from another arm of the I branch of the combined interferometer after the output combiner of the parent (e.g. $I_R$); $\Delta\phi$ represents a phase difference between the two arms where the coordinate system is aligned without loss of generality such that the angle of one arm is $+\Delta\phi/2$ and the angle of the other arm is $-\Delta\phi/2$, as may be illustrated by diagram 400; $re^{+j\alpha}$ represents a general complex function form of the $Q$ branch vector where r is the vector magnitude and $\alpha$ is the total vector angle as may be illustrated by diagram 400. Equation (10) may be rewritten as:

$$T_{MZ} = T_{MZ,I} + r^2 + 2ar\cos\left(\alpha + \frac{\Delta\phi}{2}\right) + 2br\cos\left(\alpha - \frac{\Delta\phi}{2}\right) \quad (11)$$

where $T_{MZ,I}$ corresponds to the transfer function for the I branch without the Q branch, $r^2$ corresponds to a direct current (dc) component of the transfer function, and $$2ar\cos\left(\alpha + \frac{\Delta\phi}{2}\right) + 2br\cos\left(\alpha - \frac{\Delta\phi}{2}\right)$$

represent cross product terms. In this case, for perturbation of the form shown in (7), an inner product may be performed to determine the error function, where:

$$f = f_{MZ,I} + f_{CP} \quad (12)$$

where $f_{MZ,I}$ is the single interferometer I error function:

$$f_{MZ,I} = -2abNJ_1(\phi_1)\sin(\phi_0) \quad (13)$$

and $f_{CP}$ is a contribution of the cross product terms. To obtain a null value or a maximum value for calibration of I at the presence of $Q$, $f_{CP}$ may be proportional to $-\sin(\phi_0)$ such that the error function crosses zero at the correct values with the correct slope. Using (4) and (8) the cross product contribution may be determined as:

$$f_{CP} = -4arNJ_1\left(\frac{\phi_1}{2}\right)\sin\left(\alpha + \frac{\phi_0}{2}\right) - 4brNJ_1\left(\frac{\phi_1}{2}\right)\sin\left(\alpha - \frac{\phi_0}{2}\right) \quad (14)$$

and $f_{CP}$ may be determined as:

$$f_{CP} = 4rNJ_1\left(\frac{\phi_1}{2}\right)\left[(b-a)\sin\alpha\cos\frac{\phi_0}{2} - (b+a)\cos\alpha\sin\frac{\phi_0}{2}\right] \quad (15)$$

Thus, the I branch phasor vector may be determined as:

$$ae^{-j\frac{\phi_0}{2}} + be^{+j\frac{\phi_0}{2}} \triangleq Re^{j\psi} \quad (16)$$

where R is the amplitude of the I vector and $\psi$ is its phase. Using the relations:

$$R\cos\psi = (b+a)\cos\left(\frac{\phi_0}{2}\right) \quad (17)$$
$$R\sin\psi = (b-a)\sin\left(\frac{\phi_0}{2}\right)$$

and maintaining collinearity means that for each step such that:

$$\alpha = \psi \quad (18)$$

and substituting (17) into (15) it may be determined that:

$$f_{CP} = 4rR^{-1}NJ_1\left(\frac{\phi_1}{2}\right)\left[(b-a)^2\sin\frac{\phi_0}{2}\cos\frac{\phi_0}{2} - (b+a)^2\cos\frac{\phi_0}{2}\sin\frac{\phi_0}{2}\right] = -8rR^{-1}abNJ_1\left(\frac{\phi_1}{2}\right)\sin\phi_0 \quad (19)$$

Thus, unless the angle of $Q$ is adjusted before each determination of the error function, the error function may be erroneous with respect to calibrating I.

Although some implementations, described herein, may be described in terms of a vector representation of voltages and/or error functions, a controller calibrating a combined interferometer may utilize another data representation technique, such as a lookup table, an algorithmic representation, and/or the like. Moreover, although some implementations, described herein, may be described in terms of a set of mathematical equations, some implementations described herein may be determined without solving a set of equations, such as based on a data structure storing values, based on a set of preconfigured results, and/or the like.

Returning to optimizing I at a presence of $Q$ in FIG. 4, diagram 400 is a vector representation of I and $Q$, where an angle, $\phi$, is an angle between a left arm and a right arm of I, which is calibrated in the presence of $Q$, and an angle $\alpha$ of the $Q$ vector relative to the real axis. Diagram 410 is a representation of an output power of I, diagram 420 is a diagram of an angle of I, and diagram 430 is a diagram of an error function of I at an output of the combined parent interferometer. In this case, based on maintaining I and $Q$ collinearly (e.g., using electrodes of a parent interferometer of I and $Q$, an error function (measured at the output of the combined interferometer) approaches zero at a null or maximum (despite the presence of Q), thereby enabling calibration of I in a presence of $Q$ (e.g., without Q distorting the error function of I). In this way, (19) may be illustrated. For example, a controller may determine that a null or a max is determined within a threshold accuracy based on determining that the error function is within a threshold amount of 0. For example, a voltage tolerance may be determined by two voltages that show opposite signs of the error function. In this case, as shown in diagram 430, the null or maximum point occurs at phase values of $-2\pi$, $-\pi$, 0, $\pi$, and $2\pi$. As shown, a total vector angle, shown in diagram, 420, is associated with a threshold change around the null point, which may indicate that maintaining the collinearity may result in a threshold level of accuracy of calibration. As a result, I and Q may be continuously or semi-continuously maintained at a state of collinearity.

As indicated above, FIG. 4 is provided merely as an example. Other examples are possible and may differ from what was described with regard to FIG. 4.

FIGS. 5A-5E are diagrams relating to example process 200 shown in FIG. 2.

Figure 5B:
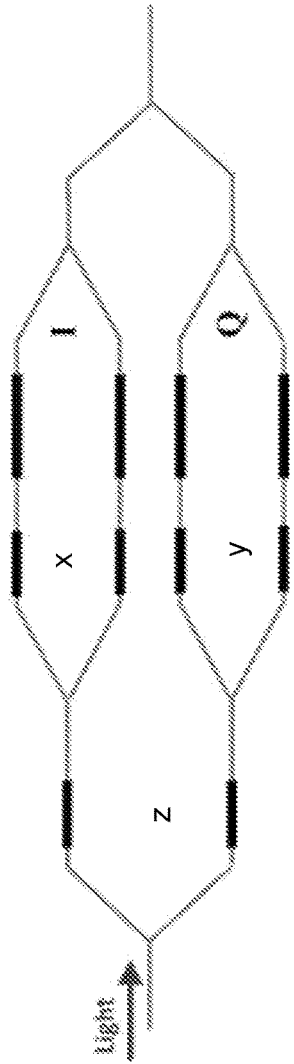
Figure 5C:
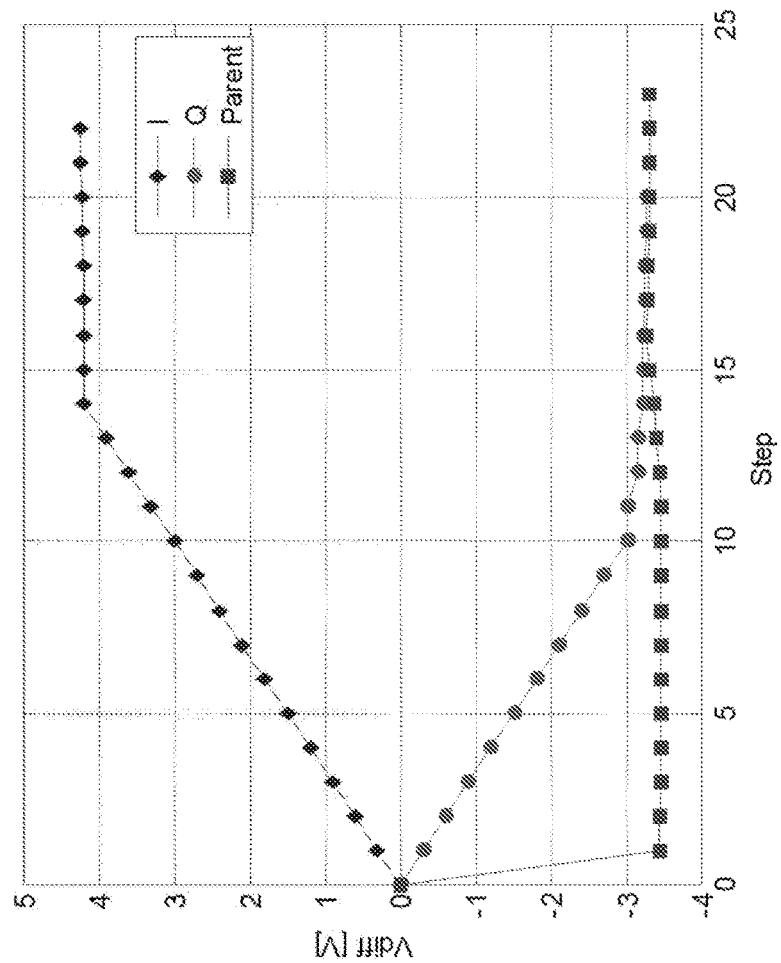
Figure 5D:
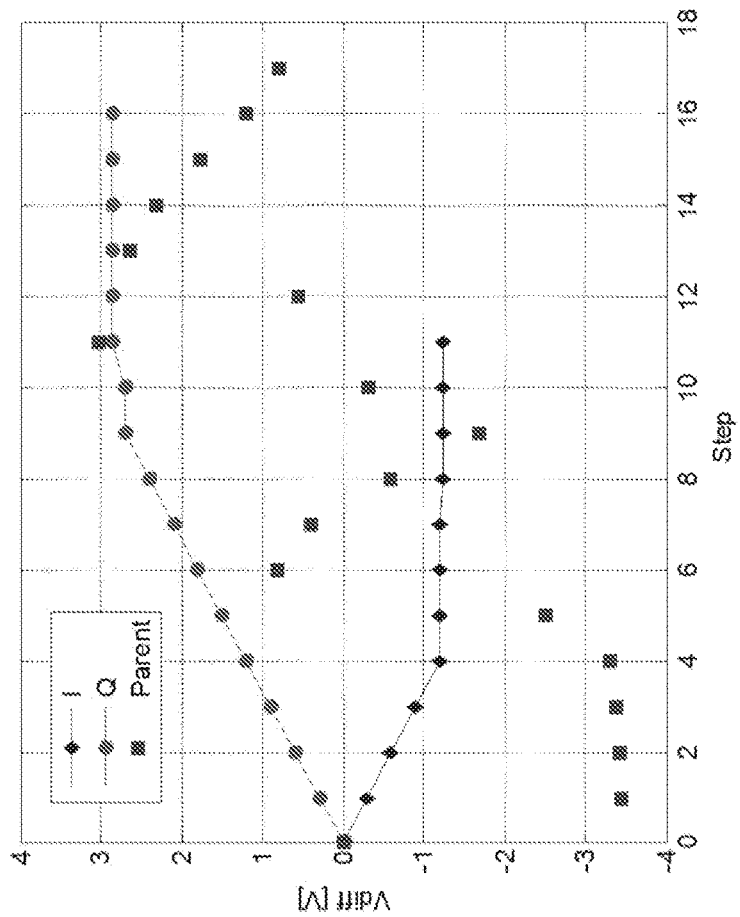
Figure 5E:
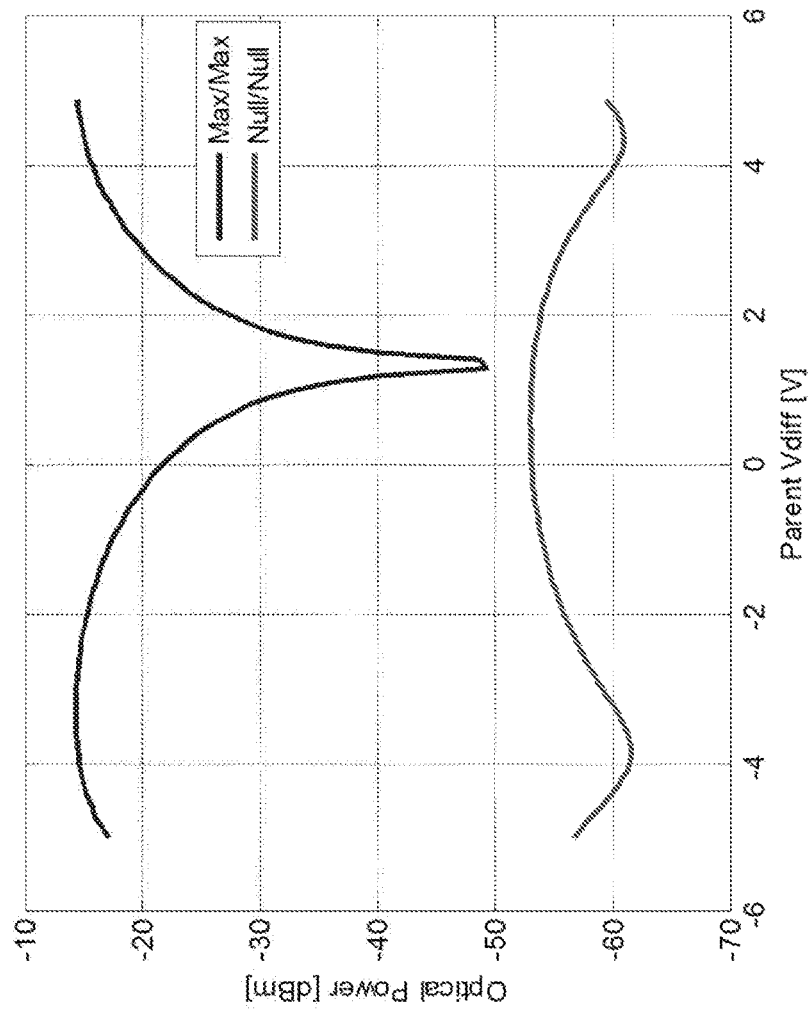

FIG. 5A is an example block diagram of a process 500 for adjusting a voltage differential to calibrate a combined interferometer structure. In some implementations, example process 500 may be performed by a controller, such as controller 180 shown in FIG. 1. Additionally, or alternatively, example process 500 may be performed by another component, such as a component of a device that includes the combined interferometer structure, a component of a calibration device separate from the combined interferometer structure, and/or the like. FIG. 5B shows an example combined interferometer structure 550, which may correspond to combined interferometer structure 110 shown in FIG. 1, in which process 500 may be performed. For example, combined interferometer structure 550 may be associated with a parent interferometer with a voltage differential z, an I branch child interferometer (I) with a voltage differential of x, and a Q branch child interferometer (Q) with a voltage differential of y. FIGS. 5C-5E show examples of voltage differentials relating to performing process 500.

As further shown in FIG. 5A, process 500 may include aligning I and Q to a maximum with z=0 (block 505) as an initial configuration (other initial configurations may be possible to minimize an amount of time and/or configuration steps to achieve collinearity), which means I and Q are collinear, as described above.

As further shown in FIG. 5A, process 500 may include generating error functions for I and Q with x=x0 and y=y0 and identifying directions of nulls and maximums (block 510), as described above. The error functions for I and Q may be generated concurrently by using orthogonal perturbations, such as sine perturbations for I and cosine perturbations for Q, using sine perturbations for Q and cosine perturbations for I, and/or the like.

As further shown in FIG. 5A, process 500 may include aligning I and Q to a maximum using a previous z value as a starting point with x+dx and y+dy (block 515), as described above.

As further shown in FIG. 5A, process 500 may include generating error functions for I and Q with x+dx and y+dy (block 520), as described above.

As further shown in FIG. 5A, process 500 may include determining whether a tolerance is satisfied for both x and y (block 525), as described above.

As further shown in FIG. 5A, process 500 may include, when the tolerance is satisfied (block 525—YES), determining that the combined interferometer is calibrated (block 530), as described above.

As further shown in FIG. 5A, process 500 may include, when the tolerance is not satisfied (block 525—NO), adjusting values for x, y, dx, and/or dy (block 535), as described above.

As shown in FIG. 5C, diagram 560 represents a diagram of a convergence when calibration of I and Q to their maximum was performed, at different voltage differential values corresponding to different steps of calibration. As shown, for a maximum, a parent state converges relatively quickly (e.g., relative to for a null as described below). For example, an adjustment to a phase of child interferometers I and Q (and an adjustment to a voltage differential ($V_{diff}$) of the parent interferometer of the combined interferometer structure) results in less than a threshold voltage tolerance value when determining a maximum convergence for the I branch child interferometer and the Q branch child interferometer. Similarly, as shown in FIG. 5D, and by diagram 570, a null convergence may be determined. For the null convergence determination, a rotation of the parent interferometer is greater than for determining the maximum convergence due to a sensitivity of a vector angle of each of I and Q around null. For example, as shown in FIG. 5E, and by diagram 580, an optical power may be determined (in decibel milli-watts (dBm)) relative to the voltage differential of the parent interferometer. In this case, a difference between a maximum optical power during a maximum to maximum (Max/Max) sweep of the voltage differential relative to a null to null (Null/Null) sweep of perturbations may be approximately 38 dBm.

As indicated above, FIGS. 5A-5E are provided merely as an example. Other examples are possible and may differ from what was described with regard to FIGS. 5A-5E.

In this way, a combined interferometer structure may be calibrated without using a bias to block branches of the combined interferometer structure, thereby reducing a likelihood of damage to the combined interferometer structure. Moreover, branches of the combined interferometer structure may be concurrently calibrated by maintaining collinearity between the branches and using orthogonal dithering signals.

The foregoing disclosure provides illustration and description, but is not intended to be exhaustive or to limit the implementations to the precise form disclosed. Modifications and variations are possible in light of the above disclosure or may be acquired from practice of the implementations.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:
1. A device, comprising:
  a plurality of interferometers,
    the plurality of interferometers including:
      a parent interferometer,
      a first child interferometer coupled to a first branch of the parent interferometer, and
      a second child interferometer coupled to a second branch of the parent interferometer; and
      wherein at least one of the plurality of interferometers is calibrated by causing phase output of the first branch to be collinear with phase output of the second branch and using perturbation signals, and
      wherein a first interferometer, of the plurality of interferometers, and a second interferometer, of the plurality of interferometers, are configured to be calibrated using a first error function and a second error function generated based on a common measurement of the plurality of interferometers.

2. The device of claim 1, wherein the phase output of the first branch is collinear with the phase output of the second branch when an optical field vector of the phase output of the first branch is associated with a same phase angle as an optical field vector of the phase output of the second branch.

3. The device of claim 1, wherein the first interferometer and the second interferometer are configured to be calibrated concurrently.

4. The device of claim 1, wherein the perturbation signals include at least one of: an analog dithering signal or a digital dithering signal.

5. The device of claim 1, wherein the perturbation signals include at least one of: a time-domain varying dithering signal, a phase-domain varying dithering signal, or a voltage-domain varying dithering signal.

6. The device of claim 1, wherein the at least one of the plurality of interferometers is calibrated using a plurality of measurements of the perturbation signals, and
wherein the plurality of measurements are associated with a configured voltage spacing.

7. A combined interferometer, comprising:
a parent interferometer, a first child interferometer, and a second child interferometer forming a combined interferometer structure; and
one or more components to:
apply, concurrently, a first perturbation signal to the first child interferometer and a second perturbation signal to the second child interferometer,
wherein the first perturbation signal is orthogonal to the second perturbation signal;
determine values for an error function based on a third output of the combined interferometer structure based on applying the first perturbation signal and the second perturbation signal; and
selectively adjust a phase of the combined interferometer based on the values for the error function to align a phase output of the first child interferometer with a phase output of the second child interferometer to achieve collinearity of phase to calibrate the combined interferometer.

8. The combined interferometer of claim 7, wherein the first child interferometer includes a first arm and a second arm and the first arm includes a third child interferometer and the second arm includes a fourth child interferometer, and
wherein the second child interferometer includes another first arm and another second arm and the other first arm includes a fifth child interferometer and the other second arm includes a sixth child interferometer.

9. The combined interferometer of claim 7, wherein an optical power of the combined interferometer is greater than a threshold optical power.

10. The combined interferometer of claim 7, wherein the one or more components are configured to determine a null or a maximum for the combined interferometer to calibrate the combined interferometer.

11. The combined interferometer of claim 7, wherein the first perturbation signal and the second perturbation signal are offline dither tones.

12. The combined interferometer of claim 7, wherein the values for the error function correspond to one or more measurements of the third output of the combined interferometer.

13. The combined interferometer of claim 7, wherein the values for the error function correspond to a particular quantity of measurements of the third output of the combined interferometer,
wherein the particular quantity is a plurality of measurements.

14. The combined interferometer of claim 7, wherein the first child interferometer and the second child interferometer have a relative phase applied, and
wherein the relative phase is calibrated for the combined interferometer.

15. The combined interferometer of claim 7, wherein the first child interferometer and the second child interferometer have a relative voltage applied, and
wherein the relative voltage is calibrated for the combined interferometer.

16. The combined interferometer of claim 7, wherein the one or more components adjust a parent interferometer voltage differential concurrently with adjusting at least one of a first child interferometer voltage differential or a second child interferometer voltage differential to maintain the collinearity.

17. A method comprising:
applying, by a device, a first perturbation signal to an in-phase (I) child interferometer and a second perturbation signal to a quadrature (Q) child interferometer while maintaining collinearity of phase of a phase output of the I child interferometer and a phase output of the Q child interferometer,
wherein the I child interferometer forms a first branch of a parent interferometer and the Q child interferometer forms a second branch of the parent interferometer;
wherein the first perturbation signal is orthogonal to the second perturbation signal;
determining, by the device, values for an error function based on a phase output of the parent interferometer and based on applying the first perturbation signal and the second perturbation signal; and
selectively adjusting, by the device, a characteristic relating to at least one perturbation signal of the first perturbation signal, the second perturbation signal, or a third perturbation signal for the parent interferometer based on the values for the error function to calibrate the I child interferometer and the Q child interferometer.

18. The method of claim 17, wherein the first perturbation signal and the second perturbation signal are applied offline.

19. The method of claim 17, further comprising:
adjusting a voltage of at least one parent electrode of the parent interferometer to maintain collinearity of phase of the phase output of the I child interferometer and the phase output of the Q child interferometer.

20. The method of claim 17, wherein the parent interferometer is coupled to more than two child interferometers, and
wherein the characteristic is selectively adjusted to calibrate the more than two child interferometers.

* * * * *